Sept. 19, 1967     R. S. SMITH ETAL     3,342,062
LEAK TESTING APPARATUS
Filed Jan. 25, 1965
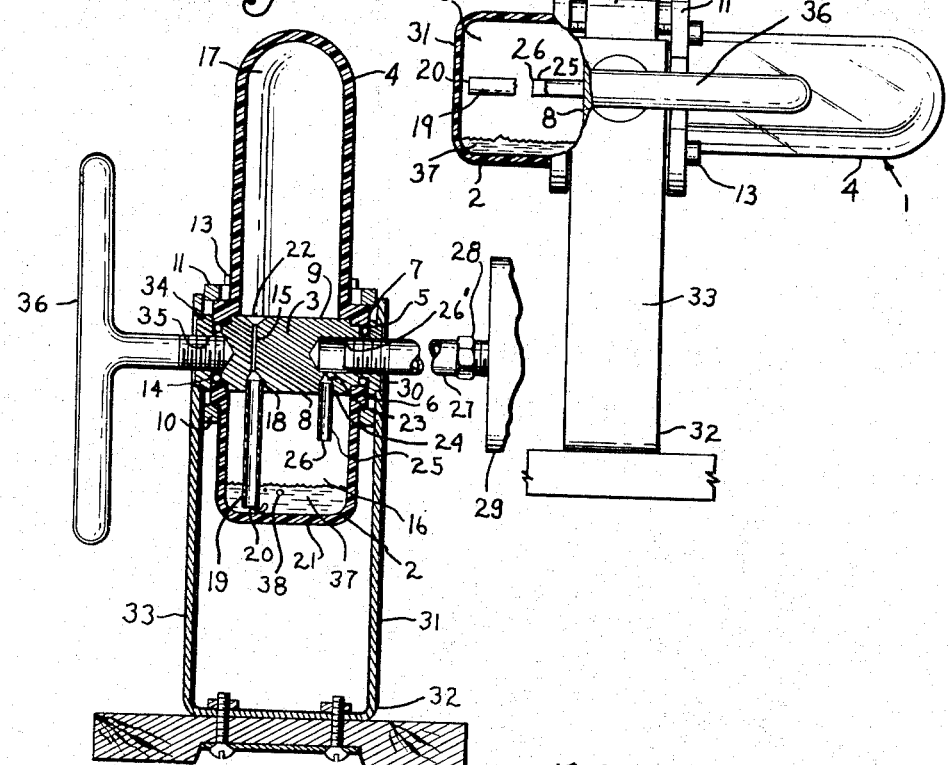
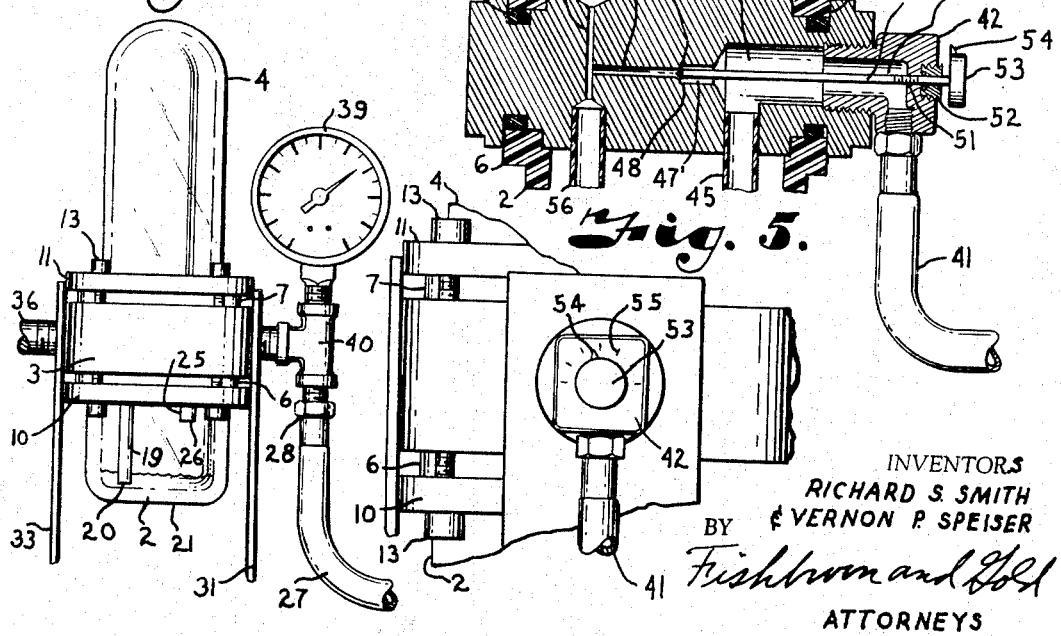
INVENTORS
RICHARD S. SMITH
& VERNON P. SPEISER
BY Fishburn and Gold
ATTORNEYS 3,342,062
LEAK TESTING APPARATUS
Richard S. Smith, Prairie Village, Kans., and Vernon P. Speiser, Kansas City, Mo., assignors to Seek-A-Leak, Inc., Kansas City, Mo., a corporation of Missouri
Filed Jan. 25, 1965, Ser. No. 427,840
4 Claims. (Cl. 73—49.2)

ABSTRACT OF THE DISCLOSURE

Leak testing apparatus includes a body member having opposed surfaces and transparent chambers respectively sealed to the surfaces, the chambers being in communication through a bore extending through the body member between the surfaces. A tube communicates with the bore at one of the surfaces and extends therefrom normally beneath the surface of a liquid contained within one of the chambers. The body member is pivotally mounted on a support bracket and a handle is provided for selectively pivoting the body member so that an end of the tube is selectively beneath the surface of a liquid or out of the liquid. A passageway into the liquid containing chamber connects to a pressure vessel to be tested.

---

This invention relates to leak testing apparatus and more particularly to portable apparatus for testing gas leakage in closed vessels or systems.

Leak testing apparatus having a transparent, liquid containing, testing bowl into which a bubbler tube extends is known. Further, such apparatus is known wherein the testing bowl is rotated to cause the bubbler tube to emerge from the liquid during charging conditions; Patent No. 3,103,910, issued Sept. 17, 1963. The latter apparatus, however, has proved somewhat awkward in that a pressure tank communicating with the testing bowl is bulky and, in the event that an error is made causing the liquid in the testing bowl to back into the pressure tank, it is difficult to cause the liquid to return into the testing bowl for regaining operation of the instrument.

The principal objects of the present invention are: to provide a leak testing apparatus of the above noted type which is simpler in construction, less bulky and more easily used by inexperienced personnel; to provide such apparatus wherein a pressure bowl replaces the pressure tank and is located in opposed relation to the testing bowl; to provide such apparatus wherein direct communication is provided between the interior of the opposed bowls whereby liquid accidentally urged into the pressure bowl may be easily drained back into the testing bowl; to provide such apparatus which may be easily mounted on a stand or bracket for convenient rotation from a charging position to a testing position; to provide a modified form of such apparatus which will signal only if leakage is above a predetermined rate; to provide such apparatus which is easily used for testing leakage into a vacuum tank as well as leakage from a pressure vessel or other pressure containing device or system; and to provide such apparatus which is rugged in construction and highly versatile in use.

Other objects and advantages of this invention will become apparent from the following description taken in connection with the accompanying drawings wherein are set forth by way of illustration and example certain embodiments of this invention.

FIG. 1 is a vertical cross-sectional view through leak testing apparatus embodying this invention shown in testing position.

FIG. 2 is a fragmentary side elevation of the apparatus of FIG. 1 with a portion broken away and shown rotated 90° into charging position.

FIG. 3 is a fragmentary side elevation of a modified form of apparatus including a gauge communicating with a testing hose.

FIG. 4 is a fragmentary cross-sectional view of the testing apparatus on an enlarged scale showing a modified form for indicating leakage above predetermined rates including a metering pin.

FIG. 5 is a fragmentary side elevation of structure shown in FIG. 4.

Referring to the drawings in more detail:

The reference numeral 1 generally indicates a leak testing apparatus embodying this invention. The apparatus 1 includes a transparent testing bowl 2 preferably of a suitable synthetic resin material having the ability to contain relatively high pressures, a body member 3 preferably of suitable corrosion resistant metal and a pressure bowl 4 preferably of material similar to the bowl 2. The body member 3, in the illustrated example, is circular and has suitable opposed circular depressions or grooves 5 extending adjacent the periphery thereof. The grooves 5 are adapted to receive enlarged flanges 6 and 7 respectively adjacent the open ends of the bowls 2 and 4 whereby the bowls are in opposed relation extending oppositely outwardly from the body member 3. The open ends of the bowls are thereby closed by opposite generally parallel faces or surfaces 8 and 9 of the body member 3 containing the grooves 5. Clamp rings 10 and 11 engage the respective flanges 6 and 7. Suitable cap screws 13 are threadedly engaged with the body member 3 and abut the rings 10 and 11 to urge the respective flanges into sealing contact with O-ring seals 14 contained within the grooves 5. The pressure bowl 4 and testing bowl 2 have a wall strength sufficient to withstand the maximum pressure to which the device may be subjected.

The body member 3 has a bore 15 extending from the lower surface 8 to the upper surface 9 so as to provide direct communication between the interior chamber 16 formed by the bowl 2 and the interior chamber 17 formed by the bowl 4. The bore 15 is expanded at 18 adjacent the lower surface 8 and receives one end of a first tube 19 therein, the tube 19 terminating at the free end 20 thereof near the bottom wall 21 of the bowl 2. The opposite end of the bore 15 flares out into a funnel 22 opening into the chamber 17 whereby liquid trapped in the chamber 17 may flow downwardly through the bore 15 and first tube 19 into the chamber 16 as is noted hereinafter.

The body member 3 has a bore 23 extending upwardly thereinto from the lower surface 8 and spaced from the bore 15. The bore 23 is expanded at 24 adjacent the lower surface 8 and receives one end of a second tube 25 thereinto which extends into the chamber 16 but is substantially shorter than the first tube 18. The second tube 25 terminates at a lower end 26 approximately midway between the bottom wall 21 and the body member surface 8.

A blind threaded opening 26' extends laterally into the body member 3 and communicates with the bore 23. A hose 27 is threadedly engaged at one end thereof in the opening 26' and terminates at the other end thereof in a coupling 28 for connection to a pressure vessel 29 to be leak tested. The opening 26' extends axially through a projecting ear 30 formed between the surfaces 8 and 9 on the body member 3. The ear is adapted to be pivotally received in the upper end of a leg 31 forming part of a support bracket 32. The support bracket 32 has a leg 33 extending upwardly from a base 34 parallel to and spaced from the leg 31 and is adapted to receive a similar ear 34 formed on the body member 3 in opposed position to the ear 30. A threaded bore 35 is formed axially into the ear 34 and a handle 36 is engaged thereinto. By grasping the handle 36, the apparatus 1 may be conveniently rotated on the ears 30 and 34 from a vertical or testing position as illustrated in FIG. 1 to a generally horizontal or charging position as illustrated in FIG. 2.

Liquid 37 is contained within the bowl 2 to a depth which, while the apparatus is in testing position, causes the lower end 20 of the first tube 19 to be submerged but which does not cover the lower end 26 of the second tube 25.

The hose 27 is attached by means of the coupling member 28 to a pressure vessel or the like 29. It is to be understood that the vessel 29 can take many forms, such as pneumatic tires, footballs, automobile radiators, piping systems or the like and the use of the apparatus eliminates any need for submerging the vessel in liquid to locate leaks.

In use, the apparatus 1 is rotated to the charging position as illustrated in FIG. 2 wherein the lower ends 26 and 20 of the respective tubes 25 and 19 are above the surface of the liquid 37. The coupling 28 is suitably connected to the vessel 29 and pressure is applied in any suitable manner into the vessel 29. Such pressure is experienced in the chamber 16 and also in the chamber 17 due to the communication therewith through the bores 23 and 15. After pressure is equalized, which normally takes only an instant, the apparatus 1 is rotated to a vertical or testing position as shown in FIG. 1. If there is a leak in the vessel 29, the pressure therein will become lower than the pressure in the chamber 17 whereupon flow will occur downwardly through the bore 15 and through the first tube 19 creating bubbles 38 from the lower end 20 of the first tube 19. It is to be understood that if it is desired to test a vacuum vessel instead of a pressure vessel, the tubes 19 and 25 are reversed whereupon leakage into the vessel will produce flow upwardly through the bore 15 and produce bubbles from the lower end of the submerged tube.

If through error the pressure vessel 29 is charged when the apparatus 1 is in a vertical position, the liquid 37 will be forced upwardly through the first tube 19 and bore 15 into the chamber 17. This does not present a serious problem since it is only necessary to disconnect the hose 27 or reduce the pressure in the vessel 29 producing a reverse pressure differential which will cause the liquid in the chamber 17 resting on the upper surface 9 to flow through the bore 15 and tube 19 back into the lower chamber 16. The funnel 22 aids in completely draining the chamber 17.

Referring to FIG. 3, it is often highly convenient to known the pressure contained in the vessel 29 prior to testing. For this purpose a pressure gauge 39 may be provided which communicates with the connecting hose through a suitable T 40. The operation of the apparatus is the same.

Referring to FIG. 4, an additional embodiment of this invention is illustrated by which the apparatus will signal leakage only if the leakage exceeds a predetermined rate. In order to accomplish this, the hose 41 is connected into a coupling 42 threadedly engaged with the body member 3. The coupling 42 has a passageway 43 therein providing communication between the hose 41 and a chamber 44 within the body member which communicates with a tube designated 45, corresponding with the tube 25. A transverse passageway 46 communicates between the bore 47, corresponding to the bore 15, and the chamber 44. The passageway 46 expands at 47′ forming a shoulder 48. A metering pin 49 terminates in a point 50 adapted to engage the shoulder 48 to prevent flow therepast from the passageway 47, or when slightly backed off, to permit flow therethrough only at predetermined rates under particular pressure differentials.

The pin 49 is threadedly engaged at 51 with the coupling 42 and a suitable seal member 52 prevents leakage where the pin extends through the wall of the coupling 42. The pin 49 terminates externally in a knob 53 having a pointer 54 thereon. The pointer 54 is adapted to be aligned with spaced apart indicia 55 on the face of the coupling 42 so as to provide a visual indication of the position of the point 50 with respect to the shoulder 48. Thus, by suitable calibration, the rate of bleeding past the shoulder 48 is known when the knob 53 is rotated to predetermined positions.

The embodiment of FIGS. 4 and 5 is used in the same manner as noted above. However, if the vessel leaks at a rate which is equal to the rate of leakage past the shoulder 48, the trapped gas is by-passed through the passageway 46 and no bubbles are created at the lower end of the tube 56 which corresponds with the tube 19. If the rate of leakage in the vessel exceeds the bleed rate past the shoulder 48, the excess air is forced through the tube 56 creating the bubbles as noted above with respect to FIG. 1.

Although certain embodiments of this invention have been illustrated and described, it is not to be limited thereto except insofar as such limitations are included in the claims.

What we claim and desire to secure by Letters Patent is:

1. Apparatus for detecting leaks in a closed vessel comprising:
   (a) a body member having first and second generally parallel opposed surfaces, a first bowl having a transparent wall and having the open end thereof sealed against said first surface forming an enclosed first chamber, a second bowl having the open end thereof sealed against said second surface forming an enclosed second chamber in opposed relation to said first chamber.
   (b) a first bore through said body member and communicating between said first chamber and said second chamber, said first bore expanding into a funnel at said second surface, a quantity of liquid in said first chamber and partially filling same, a tube communicating at one end thereof with said first bore at said first surface and having the other end thereof normally extending beneath the surface of said liquid,
   (c) a transverse opening extending into said body member, a second bore communicating between said transverse opening and said first chamber and a hose communicating with said transverse opening for coupling to a pressure vessel to be tested for leaks.

2. The apparatus as set forth in claim 1 including:
   (a) second tube of shorter length than said first tube and communicating at one end thereof with said second bore at said first surface and depending into said first chamber,
   (b) said second tube being of shorter length than said first named tube and terminating at the other end thereof normally spaced above said liquid.

3. Apparatus for detecting leaks in a closed vessel comprising:
   (a) a body member having first and second surfaces, a first bowl having a transparent wall and having the open end thereof sealed against said first surface forming an enclosed first chamber, a second bowl having the open end thereof sealed against said second surface and forming an enclosed second chamber,
   (b) a first bore through said body member and communicating between said first chamber and said second chamber, a quantity of liquid in said first chamber and partially filling same, a tube communicating at one end thereof with said first bore at said first surface and having the other end thereof normally extending beneath the surface of said liquid,
   (c) a transverse opening extending into said body member, a second bore in said body member and communicating between said transverse opening and said first chamber, a hose communicating at one end thereof with said transverse opening and having the other end adapted for coupling to a pressure vessel to be tested for leaks, (d) said body member having ears extending outwardly therefrom, and including, (e) a support bracket pivotally engaging said ears for supporting said body for pivotal motion, and a handle secured to said apparatus for pivoting said apparatus on said support bracket from a position wherein the other end of said tube terminates beneath the surface of said liquid to a second position wherein the other end of said tube terminates out of said liquid.

4. Apparatus for detecting leaks in a closed vessel comprising:

(a) a body member having first and second surfaces, a first bowl having a transparent wall and having the open end thereof sealed against said first surface forming an enclosed first chamber, a second bowl having the open end thereof sealed against said second surface and forming an enclosed second chamber, (b) a first bore through said body member and communicating between said first chamber and said second chamber, a quantity of liquid in said first chamber and partially filling same, a tube communicating at one end thereof with said first bore at said first surface and having the other end thereof normally extending beneath the surface of said liquid, (c) a transverse opening extending into said body member, a second bore in said body member and communicating between said transverse opening and said first chamber, a hose communicating at one end thereof with said transverse opening and having the other end adapted for coupling to a pressure vessel to be tested for leaks, (d) a passageway communicating between said first and second bores, and (e) a needle valve adapted to control flow through said pasageway, whereby bubbles are not produced in said liquid unless flow out of said second chamber exceeds flow through said passageway.

References Cited
UNITED STATES PATENTS

| | | |
|---|---|---|
| 1,959,863 | 5/1934 | Griss. |
| 2,796,757 | 6/1957 | Peterson _____ 73—40 |
| 3,103,910 | 9/1963 | Smith et al. _____ 116—117 |

LOUIS R. PRINCE, *Primary Examiner.*

DAVID SCHONBERG, *Examiner.*

J. NOLTON, *Assistant Examiner.*